United States Patent
Clausin

[19]

[11] Patent Number: 5,883,447
[45] Date of Patent: Mar. 16, 1999

[54] VIBRATION DAMPING DEVICES WITH ACTIVE CONTROL AND COMPRISING MOVABLE WEIGHTS EXCITED BY ELECTROMAGNETS ALONG 2 OR 3 AXES

[75] Inventor: Jacques Clausin, Fourqueux, France

[73] Assignee: Mesure et Informatique Mei, Fourqueux, France

[21] Appl. No.: 875,493

[22] PCT Filed: Feb. 2, 1996

[86] PCT No.: PCT/FR96/00176

§ 371 Date: Aug. 1, 1997

§ 102(e) Date: Aug. 1, 1997

[87] PCT Pub. No.: WO96/23986

PCT Pub. Date: Aug. 8, 1996

[30] Foreign Application Priority Data

Feb. 3, 1995 [FR] France ................................. 95 01260

[51] Int. Cl.⁶ ............................... F16F 7/10; F16F 15/03
[52] U.S. Cl. ...................... 310/51; 310/112; 267/140.14; 267/140.15; 318/114
[58] Field of Search ................................. 310/51, 15, 28, 310/29, 30, 112; 73/514.24, 496; 244/164; 318/128, 114; 267/140.14, 140.15

[56] References Cited

U.S. PATENT DOCUMENTS

| | | | |
|---|---|---|---|
| 2,785,386 | 3/1957 | Nisle | 318/128 |
| 3,786,694 | 1/1974 | Willeitner | 310/51 |
| 4,169,234 | 9/1979 | Yonkers | 310/29 |
| 4,455,496 | 6/1984 | Dean et al. | 310/29 |
| 4,710,656 | 12/1987 | Studer | 310/51 |
| 4,869,474 | 9/1989 | Best et al. | 267/136 |
| 4,922,159 | 5/1990 | Phillips et al. | 310/51 |
| 5,427,362 | 6/1995 | Schilling | 267/140.14 |

Primary Examiner—Nestor Ramirez
Assistant Examiner—B. Mullins
Attorney, Agent, or Firm—Bacon & Thomas, PLLC

[57] ABSTRACT

Apparatus for reducing vibration on three axes and which can be used at normal temperatures includes two masses (49 and 50, FIG. 10) suspended by a flexible rod (48) itself suspended by two resilient suspensions (57 and 58). An electrodynamic motor constituted by two electromagnets acts along axis YY', two electromagnets act along axis ZZ', and eight electromagnets act along axis XX', the motor being servo-controlled to the vibration which is to be reduced, and generating motion of the two masses (49 and 50) along three orthogonal axes to oppose the vibrations that are to be reduced. The simpler example has two masses capable of moving in a plane and disposed at the ends of two flexible structures coupled together via a cylindrical plate. An electrodynamic motor is constituted by two or four electromagnets that act in orthogonal directions, that are servo-controlled as a function of the vibration to be reduced, and that generate motion of the two masses to oppose the vibration to be reduced along two orthogonal axes.

11 Claims, 9 Drawing Sheets

DETAIL OF ELECTRODYNAMIC MOTOR

Force to be applied

FIG. 8A force +k2

FIG. 8B $\sqrt{\text{force} + k2}$

VIBRATION DAMPING DEVICES WITH ACTIVE CONTROL AND COMPRISING MOVABLE WEIGHTS EXCITED BY ELECTROMAGNETS ALONG 2 OR 3 AXES

BACKGROUND OF THE INVENTION

1. Field of the Invention

The present invention relates to vibration-reducing apparatuses constituted by moving masses that are resiliently suspended and displaced by electromagnetic motors in directions opposite to those of the vibrations to be reduced, with the electromagnetic motors being servo-controlled to the vibration that is to be reduced in such a manner as to cause it to be decreased by a previously-set amount.

The invention is applicable whenever vibration reduction is a strategic or an economic need: military hardware, land or sea vehicles, civil aircraft, or in general wherever the presence of vibration is detrimental.

Figures 1A, 1B:
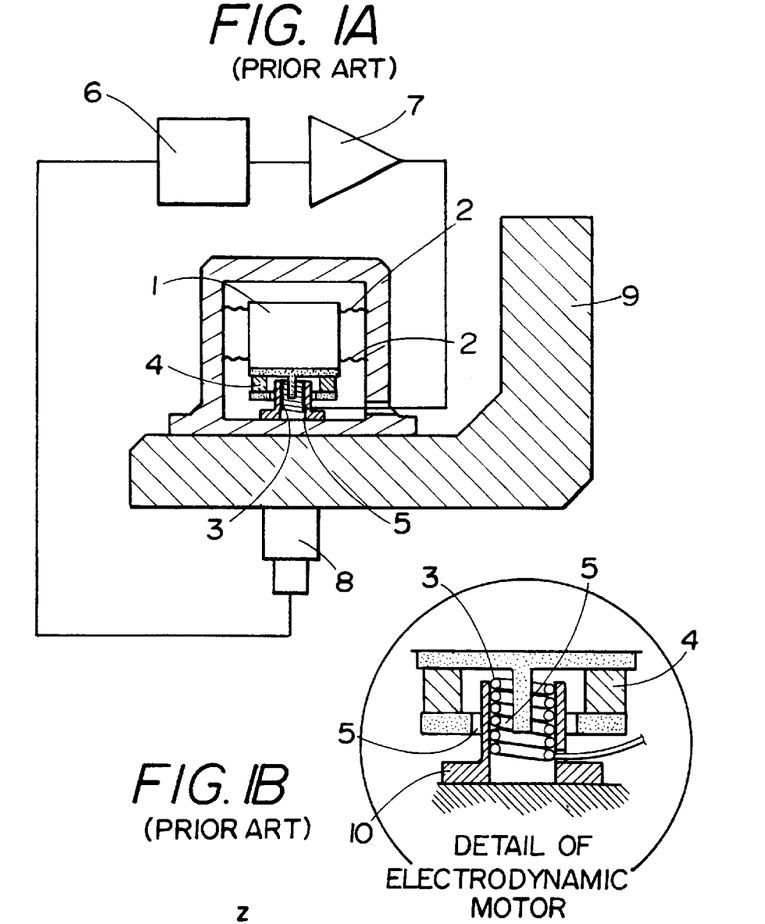

A usual disposition is shown diagrammatically in FIGS. 1A and 1B, FIG. 1B being an enlarged section view of a proton of FIG. 1A. The moving mass (1) is suspended on springs (2). The electrodynamic motor is constituted by a coil (3) carrying an alternating current that is an image of the displacement of the frame, and a magnet (4) providing a magnetic field in an air gap (5). The moving mass (1) is thus driven in the same manner as a loudspeaker membrane.

A regulator (6) and an amplifier (7) deliver control current to the coil (3) determined as a function of the vibratory amplitudes measured by an accelerometer (8) placed on the structure of the machine (9).

If m is the mass of the machine and v is its velocity prior to application of the apparatus, and M and V are the mass of the moving mass (1) and its vibratory velocity, then $M.V - m.v = 0$ when the vibratory speed of the machine is cancelled.

Figure 2:
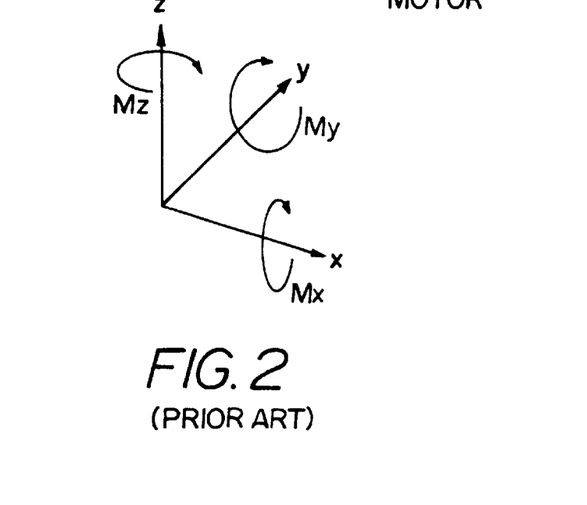

When used under real conditions, the usual disposition of FIG. 1 suffers from the drawback of being heavy and bulky, since in order to reduce the propagation of vibration from a machine to the environment, it is necessary to reduce all six mechanical components of vibration at a point, which components are as follows (FIG. 2):

three vibratory velocities along three axes Ox, Oy, and Oz; and three moments of rotation about the three axes Ox, Oy, and Oz.

Figure 3:
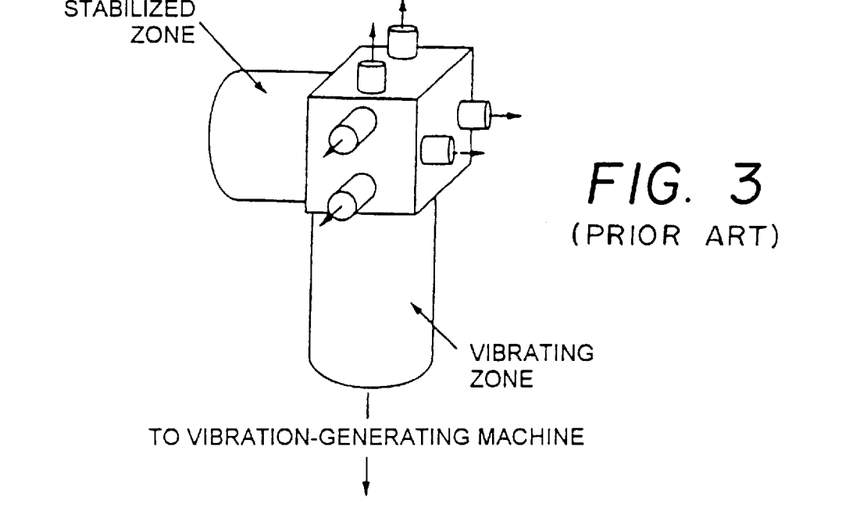

Thus, in order to obtain significant reduction of vibration, six devices are required, located as shown by way of example in FIG. 3. The amplifiers, regulators, and accompanying circuits, together with the measuring accelerometers are not shown: only the six apparatuses are shown.

Another drawback of those apparatuses results from the difficulty of evacuating the heat generated by the current flowing through the coil (3) of FIG. 1 which is thermally isolated from the structure, since the support (10) of FIG. 1 is necessarily constituted by a material that does not conduct electricity and that Is therefore a poor conductor of heat, thereby impeding the flow of heat to other, cooler locations.

To mitigate that drawback which reduces the lifetime of that type of apparatus, due in particular to the thermal and mechanical aging of the electrical insulators, it is often necessary to add a cooling fan whose own operation serves to generate vibrations in addition to the amplitudes that are to be reduced, or indeed to add cooling systems that rely on a flow of liquid coolant.

That limitation prevents the above disposition operating in high temperature applications.

Finally, a last drawback comes from the fact that the active mass is often suspended on annular springs commonly called "speeders", having a lifetime that is short and uncertain. In addition to the drawback of lifetime that is limited or uncertain since it is difficult to calculate, the above configuration is bulky, voluminous, and heavy.

Those drawbacks mean that apparatuses of the above type or variants thereof are used very little in industry and are intended more for laboratory testing.

That old design is constrained by the linear relationship that exists between the control current and the force generated, which disposition is unavoidable when servo-control is based on analog electronics.

The linearity constraint has now disappeared with the arrival of regulators and control devices that are digital.

RELATED TECHNOLOGY

The apparatus of the invention provides a low cost solution to the faults of prior apparatuses: it is reliable and long-lasting, compact and lightweight, and is capable of operating at high temperature: it makes use of technologies that are used throughout industry for their robustness.

BRIEF SUMMARY OF THE INVENTION

According to the invention, the improvements provided are due to an original design based:

on adopting motion for the active masses that is planar or tri-axial; and on a plurality of motors constituted by electromagnets of effectiveness and endurance that are well known.

Thus, the invention provides vibration-reducing apparatus comprising two active masses driven in planar or tri-axial motion, and a plurality of motors constituted by electromagnets supported by resilient means constituted by two flexible cylindrical plates or a flexible cylindrical rod and two resilient articulations.

Other characteristics of the vibration-reducing apparatus of the invention appear in the claims which are fully incorporated herein by reference.

The invention has the advantage of reducing the weight and the volume by a ratio of three to four compared with the weight an the volume of traditional apparatuses, since a single apparatus of the invention replaces two or even three traditional apparatuses.

The invention also covers use of the vibration-reducing apparatus to reducing vibration propagation in parts or machines such as ducts, particularly steam-feed ducts for power turbines, exhaust ducts from internal combustion engines, resilient supports, and drive shafts.

Two dispositions are more particularly claimed in the invention: the first disposition concerns high temperature applications. The apparatus of the invention associates coupled masses driven in planar motion and two or four electromagnets placed at an end that is more remote from the source of heat.

The second disposition relates to lower temperature applications. The apparatus of the invention then associates a mass driven in planar or tri-axial motion and a plurality of electromagnets with attraction forces oriented along three perpendicular axes, causing said mass to move.

According to the invention, the attraction of the electromagnets takes place in application of a non-linear relationship that varies approximately with the second power of the electrical control current, with the electromagnet excitation current therefore being corrected accordingly.

The following two preferred non-limiting descriptions explain the innovations claimed by the invention.

The first description corresponds to a variant of the apparatus applicable to reducing vibration propagation from parts or machines subjected to high temperatures such as steam feed ducts for power turbines, or exhaust ducts from internal combustion engines, for example. Naturally, the invention also applies to other cases.

The second description corresponds to an application at medium or low temperature, and relates to any zones through which vibration may propagate: ducts, resilient supports, drive shafts, etc.

BRIEF DESCRIPTION OF THE DRAWINGS

FIGS. 1 to 3 show a prior art disposition, FIG. 2B being a section on a larger scale of a portion of FIG. 1A.

FIGS. 4 to 6 show a first embodiment of the invention, FIG. 4A being a perspective view and FIG. 4B a section view through a scanner apparatus constituted by two active masses associated with a central support by means of two resilient arms.

FIGS. 7 and 8 relate to apparatus of the invention for high temperature applications, FIG. 7A being a longitudinal section and FIG. 7B an end view of electromagnets and how they are fastened, while FIGS. 8A, 8B, and 8C plot current (up the ordinate) as a function of time (along the abscissa).

FIGS. 10 to 13 describe a preferred embodiment of vibration-reducing apparatus of the present invention.

(FIG. 15).

DETAILED DESCRIPTION

Before proceeding with this description, it is useful to explain the principle of the mechanism used.

Figure 4A:
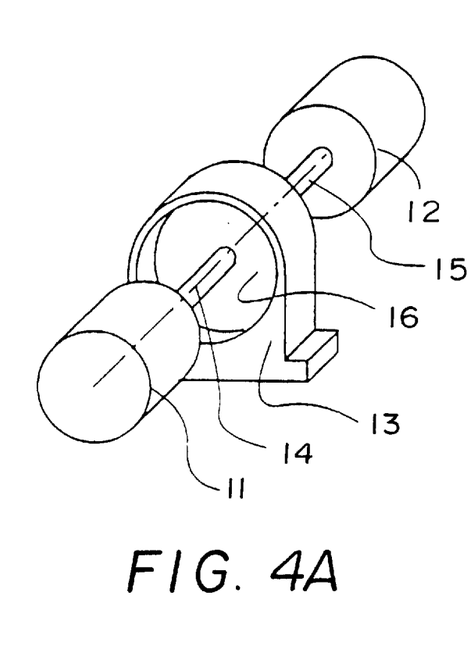
Figure 4B:
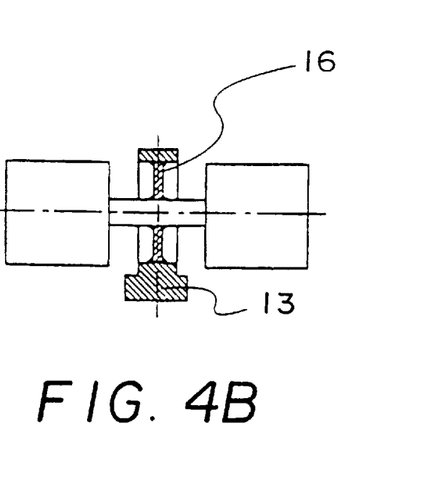
Figure 5:
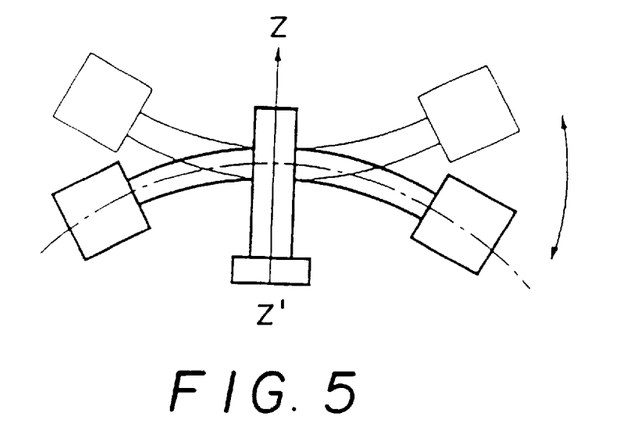
Figure 6:
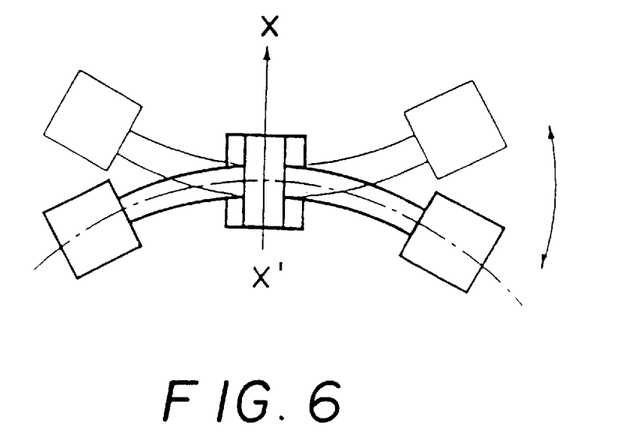

FIG. 4A is a perspective view and FIG. 4B is a section view of a planar apparatus constituted by two active masses (11 and 12), connected to a central support (13) by two resilient arms (14 and 15) united to the central support by a thin plate (16) with which they are integrally connected. The cylindrical plate (16) has its periphery connected by known means, such as brazing, to the central support (13). Because of its own resilience, the cylindrical plate (16) produces coupling between the two arms (14 and 15) which can have only one symmetrical mode of vibratory displacement about the plane of symmetry of the central support (13), as shown in FIGS. 5 and 6.

Such apparatus can act as a dynamic damper when the exciting frequency is equal to the natural frequency of the resilient arms (14 and 15) and of the active masses 20 (11 and 12), as given by the well-known equation:

$$f_0 = \frac{1}{2\pi}\sqrt{\left(\frac{k}{M}\right)}$$

k being the stiffness of an arm; and
M being the mass of one of the active masses.

Experiment and calculation nevertheless show that the natural frequencies along the axes ZZ' (FIG. 5) and XX' (FIG. 6) are different.

As it stands, such apparatus is therefore incapable, on its own, of acting as a dynamic damper in a plane (i.e. as a two-axis damper).

In addition, the length of the resilient arm (14 and 15) makes the apparatus very bulky. Finally, its operation is restricted to a small frequency range close to the resonant frequency $f_0$.

Figure 7A:
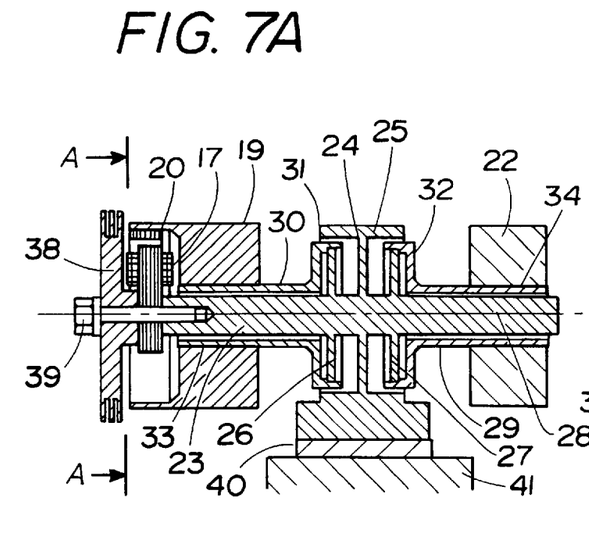
Figure 7B:
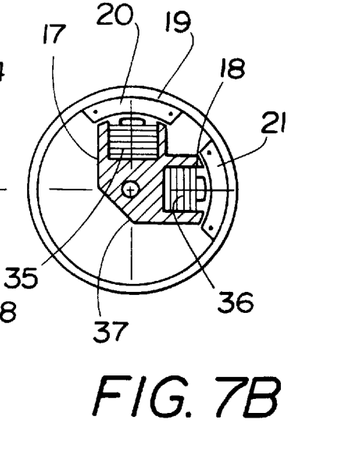

As shown in FIG. 7A which is a longitudinal section and in FIG. 7B which is an end view of the electromagnets and their fastening, the apparatus of the invention for high temperature applications provides a solution to all three of those drawbacks. To reduce bulk, the resilient arms (14 and 15) of FIG. 4 are replaced in FIG. 7 by two cylindrical plates (26 and 27) that are thin and therefore flexible, together forming a one-piece assembly with the cylindrical core (23), the third cylindrical coupling plate (24), and the cylindrical core (28) that are all precision machined in an alloy having high mechanical characteristics.

The two cylindrical plates (26 and 27) are disposed symmetrically about the plane of the cylindrical plate (24) and they are fixed by brazing or any other known means to two tubes each (29 and 30) each having a flange (31, 32) at one end and a male threaded portion (33, 34) at its other end.

The two cylindrically-shaped masses (19 and 22) have respective female threads enabling them to be screwed onto the tubes (29 and 30) so as to adjust the natural frequencies of the assembly.

Under such circumstances, the motion of the two masses (19 and 22) is a pivoting motion about points M and M' situated in the centers of the two plates (26 and 27).

According to the invention, this disposition reduces size while maintaining coupling between the two dynamic systems constituted by the masses (19 and 22) and the stiffness due to the plates (26 and 27) as ensured by the cylindrical plate (24) having its periphery closely fixed by brazing or by any other means to the support (25).

To make two-axis operation possible and to extend the active frequency range, the apparatus of the invention includes at least two electromagnets (17 and 18) which, in the example shown, make use of a common yoke constituted by a stack of laminations of soft magnetic material (37), together with two coils (35 and 36). These two electromagnets (17 and 18) attract the mass (19) along two mutually-perpendicular directions by means of two circular segments constituted by respective stacks of laminations of soft magnetic material (20, 21) secured to the mass (19).

The two electromagnets are fixed to a cylindrical core (23) which is an integral portion of the coupling cylindrical plate (24) and thus of the support (25), selected for its position furthest removed from the source of heat.

Thus, current control of the two coils (35 and 36) drives vibratory motion of the mass (19), whose movement provokes a symmetrical motion of the mass (22) with respect to the plane of the cylindrical plate (24).

To facilitate understanding the drawings, electrical wires connected to the coils are omitted.

Figure 8A:
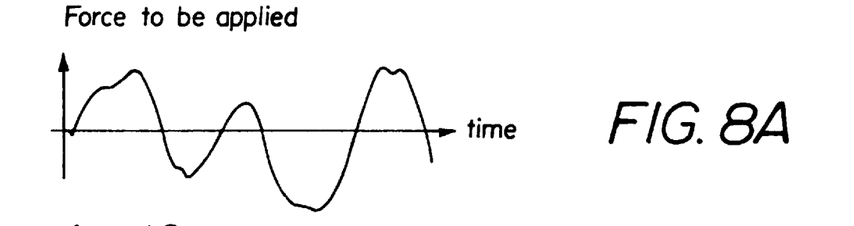
Figure 8B:
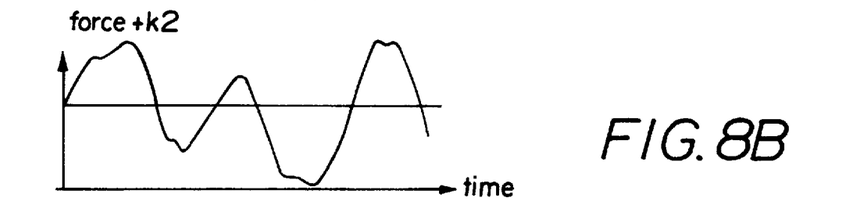

According to the invention, since the magnetic attraction satisfies a relationship which is proportional to the square of the current, the electromagnets are controlled in application of a relationship that is defined and claimed below, with generation thereof presenting no difficulty in digital technology, as described with reference to FIGS. 8A, 8B, and 8C.

$$\text{Current } I(t) = k_1 \sqrt{[F(t) + k_2]}$$

Figure 8C:
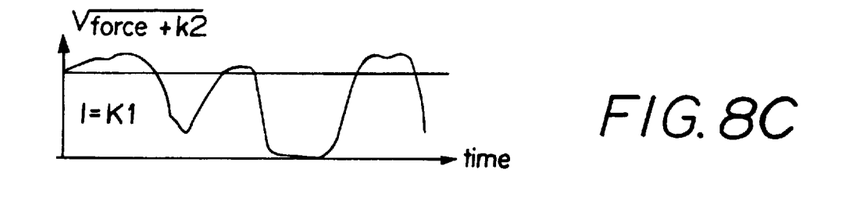

The constant $k_2$ is a numerical offset value selected in such a manner that in the active range, the sum $Y(t)=F(t)+k_2$ never becomes negative (FIG. 8C).

The constant $k_1$ is a scale factor.

The electromagnets (17 and 18) are placed at the same end of the assembly and they are secured to a cylindrical portion (38) of an alloy that is a very good conductor of heat, thus constituting a radiator for cooling by air convection, and fixed by conventional means (39).

The support (25) is fixed to the frame or structure (41) whose vibration is to be reduced by means of a soleplate of thermally-insulating material (40) having excellent mechanical qualities, e.g. a mica-based composite.

For a high temperature frame, e.g. a frame at a temperature of 300° C., the above structure makes it possible to ensure that the temperature in the vicinity of the coils (35, 36) does not exceed 100° C., thereby making a large control force possible, since the coils can then be heated by the Joule effect up to 100° C. without spoiling the electrical insulation of the conductor wires.

According to the invention, this large control force makes it possible to generate vibratory motion of the masses (19 and 22) sufficient to enable the apparatus to be effective over a very wide frequency range, going from a few Hz to several hundreds of Hz. This large control force thus makes it possible to operate the assembly at frequencies above and below its resonant frequency, thus presenting the incomparable advantage of making it possible to use a resonant frequency which is high, thereby avoiding excessive static bending associated with apparatuses having resonant frequencies which are low, such as the apparatuses that have been used in the past.

According to the invention, the radial clearance between the two cylindrical cores (23 and 28) and the two tubes (29 and 30) is small enough to ensure that in the event of a shock, the two tubes (29 and 30) press against the two cylindrical cores (23 and 28) so as to restrict deformation of the plates (26 and 27) to the elastic range of the material.

This disposition avoids any destruction due to exceeding the limits of use of the materials, in the event of a shock or of excessive vibratory displacement.

Description of the Apparatus for Medium or Low Temperatures

The second preferred description corresponds to apparatus for reducing vibration relative to three axes and intended for low or medium temperature applications, which apparatus is of a structure that is low cost, robust, and compact. Naturally, the apparatus could also be restricted to motion in a plane.

Before describing the apparatus described, it is appropriate to explain the mechanical principles used.

Figure 9A:
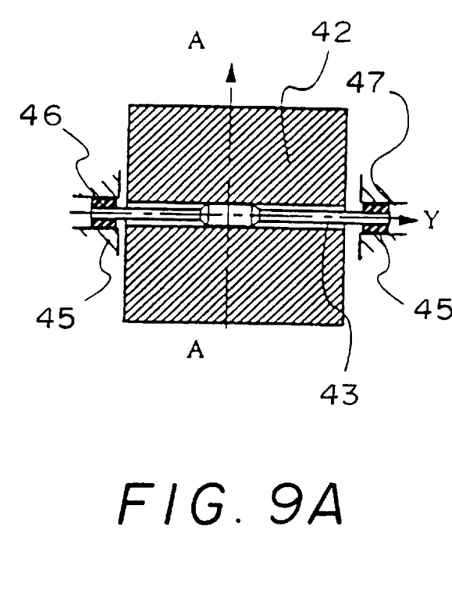
FIGS. 9A and 9B show a second embodiment of the vibration-reducing apparatus of the invention, particularly adapted to medium or low temperatures.
Figure 9B:
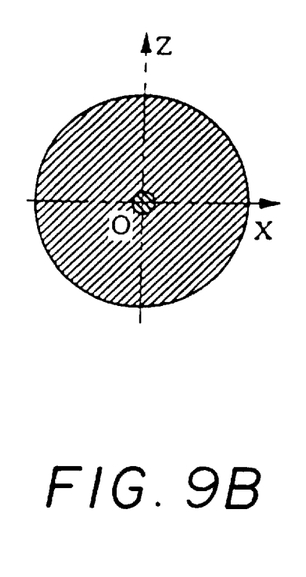

FIGS. 9A and 9B show a cylindrical mass (42) which is hollowed out in its center and fixed at its two ends to a support (45) via two resilient links (46 and 47), e.g. two elastomer cylinders that adhere firstly to the rod (43) and secondly to the support (45).

If $k_1$ is the bending stiffness of the rod (43) when driven by a force applied in its plane of symmetry, and M is the mass of the mass (42), then the assembly comprising the mass (42) and the rod (43) has a resonant frequency as follows:

$$f_1 = \frac{1}{2\pi} \sqrt{\left(\frac{k_1}{M}\right)}$$

for any motion situated in the plane XOZ.

Similarly, if $k_2$ is the axial stiffness of the two resilient links, the assembly comprising the mass (42), the rod (43), and the resilient links (46 and 47) has the following resonant frequency:

$$f_2 = \frac{1}{2\pi} \sqrt{\left(\frac{k_2}{M}\right)}$$

for any axial motion along OY.

By adjusting $k_1$ and $k_2$, it is possible to make $f_1$ and $f_2$ substantially identical, thereby enabling the apparatus to be used as a tri-axial dynamic damper, which is highly condensed and has very little bulk.

Nevertheless, since the resonant frequency cannot be adjusted, use of the apparatus is very limited.

The apparatus of the invention overcomes this drawback:

By adding an electrodynamic motor comprising three powerful electromagnets acting along three axes, that are stationary and fixed to the support, and that are therefore well cooled, the apparatus covers a large frequency range that is not limited to the above natural frequencies $f_1$ and $f_2$.

It comprises two distinct subassemblies: a mechanical subassembly and an electrodynamic motor subassembly. The numerals in the description below relate to FIGS. 10, 11, 12, and 13 which describe a preferred embodiment.

Figure 10:
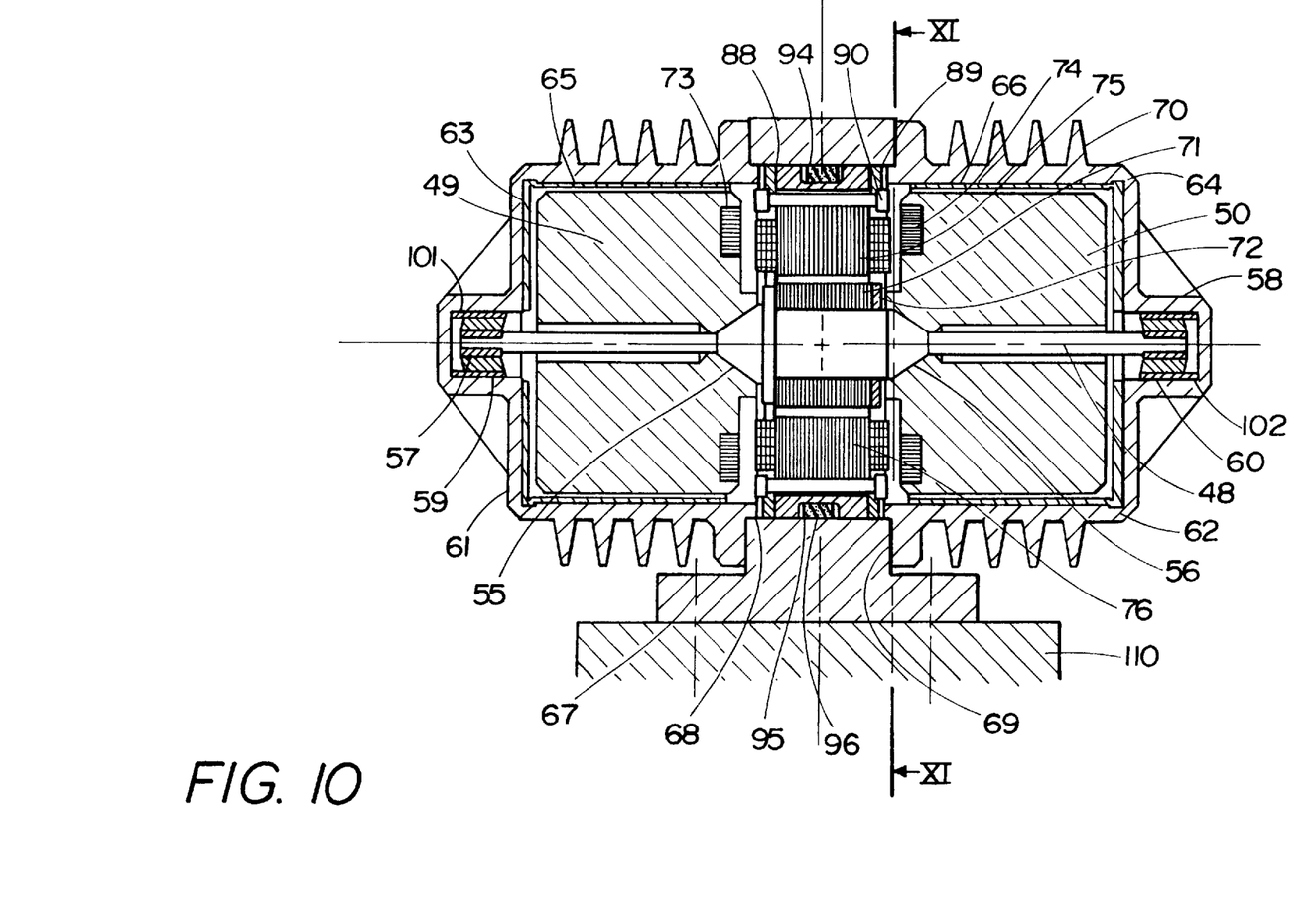
FIG. 10 being a longitudinal section.
Figure 11:
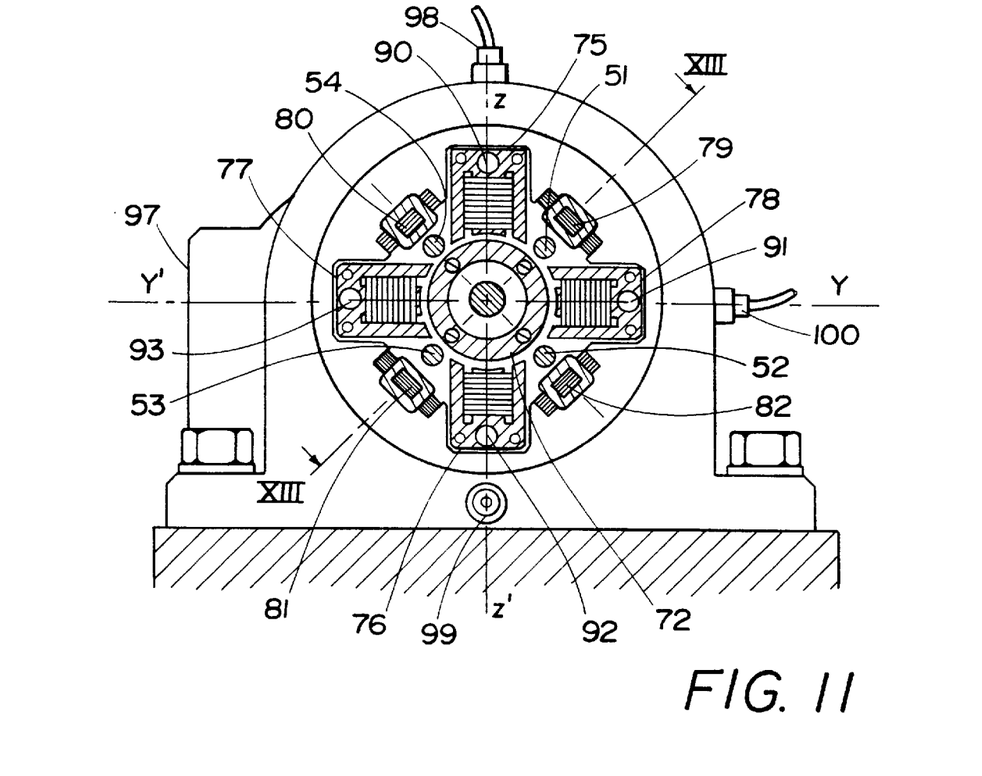
FIG. 11 being a view on XI—XI of FIG. 10.
Figure 12:
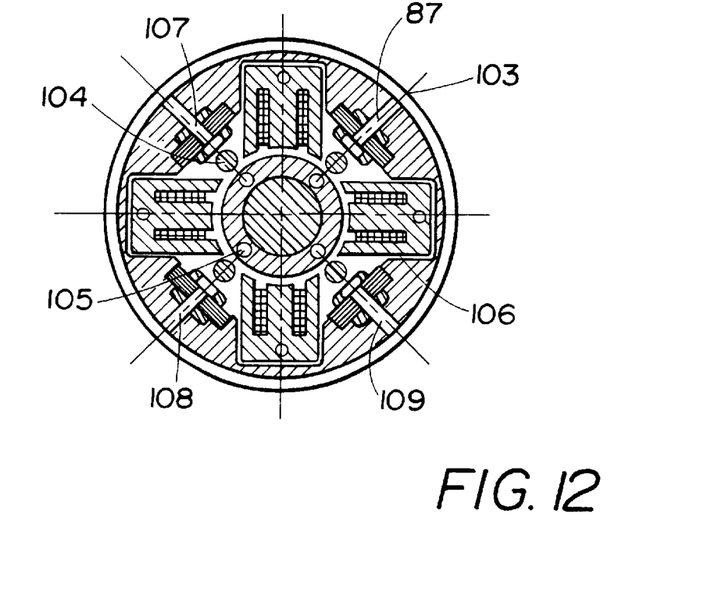
Figure 13:
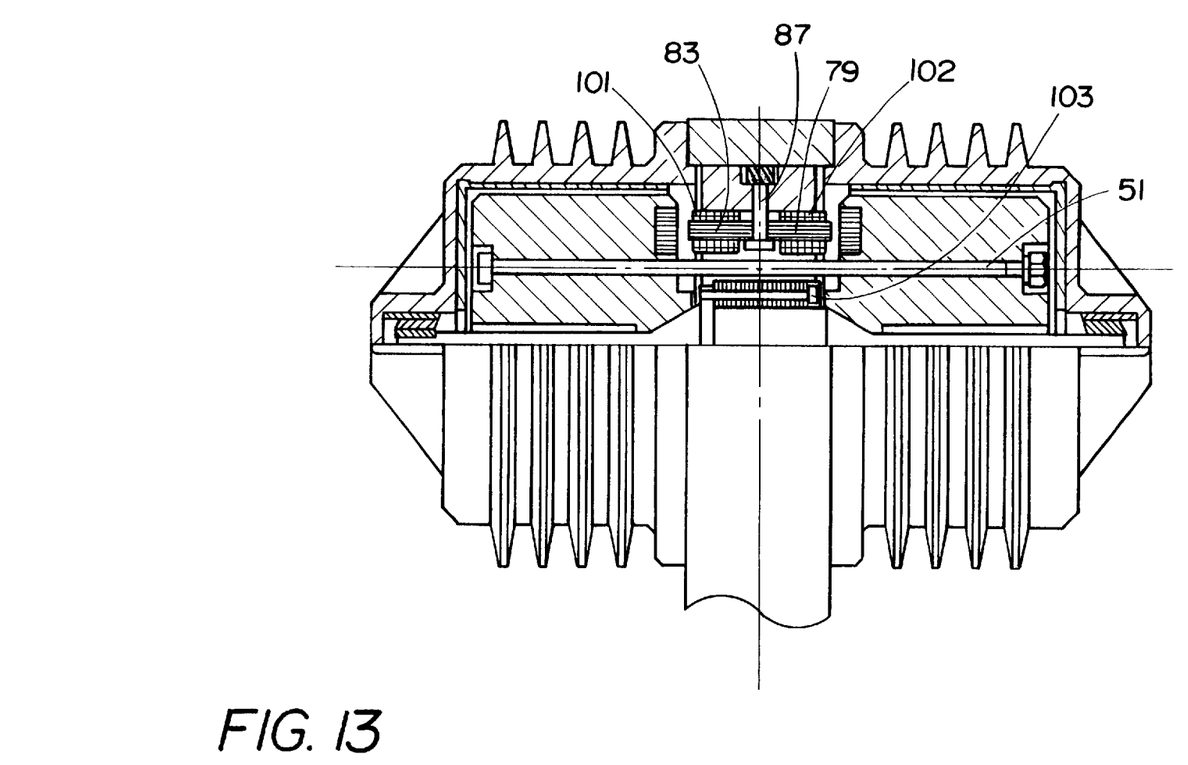
FIG. 13 being a half-section on a plane including the axis XX and the axis of one of the electromagnets having active axis XX'.

FIG. 10 is a longitudinal section, FIG. 11 is a view on XI—XI, FIG. 12 is a section in plane Y, and FIG. 13 is a half-section on a plane containing the axis XX and the axis XX' of one of the active electromagnets.

Description of the Mechanical Subassembly (FIG. 10 et seq.)

This subassembly comprises a cylindrical rod (48) of an alloy having high mechanical strength, and of section that varies, including two cylindro-conical portions (55, 56) having two cylindrical masses (49 and 50) fixed thereto, each having a conical bore. Four ties (51 to 54) provide accurate centering and immobilization of the two masses (49 and 50) and of the cylindrical rod (48) pressed against the two cylindro-conical portions (55 and 56) of the cylindrical rod (48).

The cylindrical rod (48) has two long cylindrical portions along a longitudinal axis thereof that are fine and flexible, each being terminated by a shouldered cylinder of smaller diameter on which there is engaged a resilient articulation (57) to the left and (58) to the right of the drawing in FIG. 10. These resilient articulations are commercially available under the name "silentbloc" and serve to hold the rod (48) under a small amount of axial compression and without play by means of the two resilient articulations (57 and 58), themselves being held in the shouldered bores (59 and 60) by caps (61 and 62) themselves fixed to the support bracket (67) which provides general alignment and compliance with lengths, and is itself rigidly fixed to the support (110) whose vibrations are to be reduced.

The mechanical feature of these resilient articulations (57 and 58) is that they have very low stiffness angularly and axially, while conversely they have very large stiffness radially.

The cylindrical rod (48) can therefore oscillate axially and bend radially while continuing to be centered by the two articulations (57 and 58).

The radial and axial movements of the subassembly constituted by the cylindrical rod (48) and the masses (49, 50) are limited by shock absorbing abutments that act laterally (63 and 64) and radially (65 and 66), constituted by plates or tubes of damping materials such as polyurethane, fiber composites, or other known damping materials. The set of abutments thus forms a multidirectional assembly.

When the above subassembly is in a horizontal position, which is the usual case, the flexibility of the rod supporting the suspended masses (49 and 50) gives rise to static bending such that the masses (49 and 50) come into contact with the radial shock absorbers (65 and 66). According to the invention, the machining axes of the shouldered bores (59 and 60) are thus eccentric relative to the machining axes of the centering bearing surfaces (68 and 69) when operation takes place in a horizontal position. A similar disposition is obtained by removable wedges (101 and 102) constituting means for correcting static bending during vertical use.

As an accessary measure, according to the invention, when the Q factor for mechanical resonance of the moving assembly is too high, the gap left empty between the two caps (61 and 62) and the moving parts may contain a volume of damping fluid in a quantity sufficient to adjust the Q factor to a desired value.

Description of the Electrodynamic Motor Subassembly

This assembly essentially comprises three groups of electromagnets forming a one-piece assembly and driving displacements along axes XX', YY', and ZZ', the electromagnets being completely impregnated in a compound based on an electrical quality thermosetting resin and being rigidly fixed to the support (67), thus providing optimum heat flow to the outside and towards the caps (61 and 62) which serve as cooling radiators by means of fins (70). This assembly is interposed in the empty space between the two masses (49 and 50).

To simplify the drawing, connection wires for the electromagnets are not shown.

According to the invention, radial magnetic attraction takes place via the air gap over the stack of soft magnetic alloy laminations (71) locked onto the central portion of the cylindrical rod (48) by the ring (72), and a set of ties (103, 104, 105, and 106) pressing the stack against the shoulder of the cylindrical rod (48) provided for this purpose.

According to the invention, axial attraction is performed on two toruses (73 and 74) of soft magnetic alloy lamination rolled up in conventional manner, coated in toroidal recesses machine in the masses (49 and 50) of axes coinciding with the axes of revolution of said masses.

According to the invention, the electromagnets (75 and 76) provide vibratory displacement along the axis ZZ', the electromagnets (77, 78) provide vibratory displacement along the axis YY', and the eight electromagnets (79 to 86) providing vibratory displacement along the axis XX'. Only the electromagnets (79 to 82) can be seen in FIGS. 10, 11, and 12, and the electromagnet (83) can be seen in FIG. 13. The electromagnets (83 to 86) occupy positions that are symmetrical relative to the electromagnets (79 to 82) relative to the ZY plane. They are suitably impregnated and stuck to the support (67) so as to give a high degree of mechanical stiffness and a very high degree of thermal conduction between the electromagnet coils and the support (67).

The yokes of the electromagnets (75, 76, 77, and 78) constituted by stacks of soft magnetic alloy laminations are fixed rigidly to the support (67) via two toroidal rings (88 and 89) and four fastenings of conventional type (90 to 93), and a shape part (94) of outline that matches the outside shape of the electromagnets (75 to 78) and also the electromagnets (79 to 86), and presenting a toroidal recess (95) designed to pass connection wires (96) for the coils of said electromagnets. A housing (97) connects the wires of the coils to link cables providing three regulation channels XX', YY', and ZZ'. Three servo-control accelerometers (98, 99, and 100) can be seen in FIG. 11. They provide servo-control and are not described in this invention.

Four keys (87, 107, 108, and 109) shown in FIG. 12 (one of which (87) is visible in FIG. 13) lock each electromagnet yoke common to two electromagnets acting along the axis XX and constituted by a stack of soft magnetic alloy laminations, the two coils (101, 102) visible in FIG. 13 acting in opposite directions symmetrically about the plane ZY.

The electromagnets are controlled as follows: the excitation current of an electromagnet is given by the following relationship:

Let F be the force to be applied, being positive for attraction and negative otherwise.

When F>0, then $I=k\sqrt{F}$.

With k=a scale factor.

And when $F \leq 0$, I=0.

In this way, each electromagnet of a group operates only during half the time of a cycle, in the same manner as a class C electronic power amplifier.

Figure 14A:
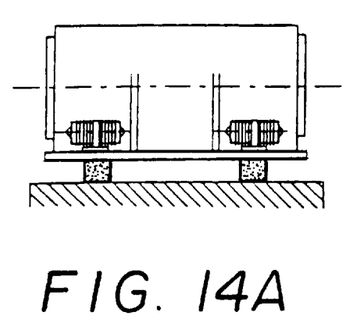
FIGS. 14A and 14B and FIG. 15 show a vibration-reducing apparatus of the invention applied upstream from a resilient suspension (FIGS. 14A and 14B) or along pipes, beams, etc.
Figure 14B:
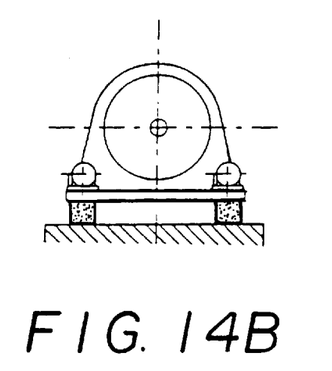
Figure 15:
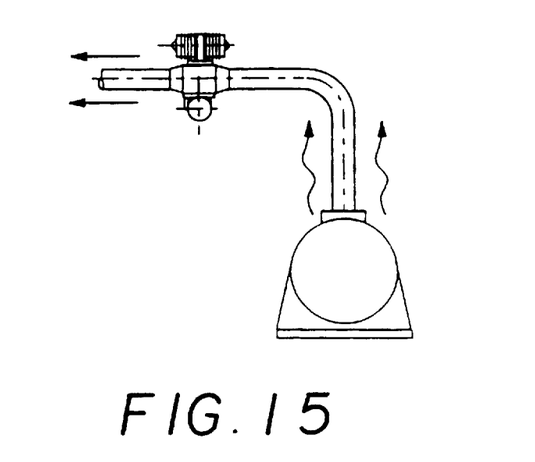

To reduce the propagation of vibration upstream from a resilient suspension, a single apparatus of the invention suffices (FIGS. 14A and 14B), in contrast, to reduce the propagation of vibration along a pipe, a beam, etc., it is necessary to have two apparatuses of the invention to block all six degrees of freedom in vibration (FIG. 15).

I claim:

1. A vibration-reducing apparatus, comprising:
   two active masses (19 and 22) which are driven in planar motion;
   a resilient arrangement constituted by two flexible cylindrical plates (26, 27); and
   a plurality of motors constituted by electromagnets (17, 18) supported by the resilient arrangement.

2. A vibration-reducing apparatus according to claim 1, acting in a plane in three-dimensional space and capable of operating at high temperature, the apparatus further comprising:
   a third cylindrical coupling plate (24) secured to a support (25), the support (25) being fixed by a sole plate of thermally insulating material (40) to the structure (41) whose vibrations are to be damped;
   two cylindrical cores (23 and 28) which unite the two flexible cylindrical plates (26 and 27) to the third cylindrical coupling plate (24); and
   two tubes (29 and 30) having terminal flanges (31 and 32) which are fixed to the two flexible cylindrical plates (26 and 27), the two active masses (19 and 22) being secured to the two tubes (29 and 30) so as to be pivotally mounted about two center points (M and M') of the two flexible cylindrical plates (26 and 27);
   wherein the electromagnets (17, 18) comprise two electromagnets which act along mutually perpendicular axes, the two electromagnets (17, 18) being attached at one end of one of the two cylindrical cores (23 and 28)

which is furthest from a heat source, the two electromagnets (17, 18) forcing one of the two active masses (19, 22) also located furthest from the heat source into planar vibratory motion which is transmitted symmetrically to the other of the two active masses (22, 19) by the third cylindrical coupling plate (24).

3. A vibration-reducing apparatus according to claim 2, wherein the electromagnets are controlled by injecting current satisfying the following relationship:

$$I(t) = k_1 \sqrt{[F(t) + k_2]}$$

with $k_1$ and $k_2$ being constants and F(t) being the exciting force to be applied to the active masses of sufficient magnitude to enable operation over a very broad frequency range, below and above the natural resonant frequency of the apparatus.

4. A vibration-reducing apparatus, comprising:
   two active masses (49 and 50) which are driven in planar or tri-axial motion;
   a resilient arrangement constituted by a flexible cylindrical rod (48) and two resilient articulations (57 and 58); and
   a plurality of motors constituted by electromagnets (75 to 86) supported by the resilient arrangement.

5. A vibration-reducing apparatus according to claim 4, acting in a plane or three dimensions and operating at medium or low temperatures, the apparatus further comprising;
   a support (67) which includes the electromagnets (75 to 86) forming a single piece assembly interposed between the two active masses (49 and 50);
   two caps (61 and 62) linked to the support; and
   multi directional shock absorbing abutments (63–66) which limit movement of the two active masses (49 and 50);
   wherein the flexible cylindrical rod (48) has a longitudinal axis, is of an alloy having high mechanical characteristics, includes two cylidro-conical portions (55 and 56) and terminates in the two resilient articulations (57 and 58) which are linked to the two caps (61 and 62); and
   wherein the two active masses (49 and 50) are two cylindrical masses having conical bores, the two cylindrical masses (49 and 50) being fixed on the cylindro-conical portions.

6. A vibration-reducing apparatus according to claim 5, wherein control of the current for each electromagnet is similar to the operation of class C electronic amplifiers, in application of the following relationship:
   if F is an attractive force to be provided by an electromagnet, then the control current is given by I=k √F; otherwise, for repulsive forces, the control current is zero.

7. A vibration-reducing apparatus according to claim 5, including means for compensating static bending.

8. A vibration-reducing apparatus according to claim 7, wherein control of the current for each electromagnet is similar to the operation of class C electronic amplifiers, in application of the following relationship:
   if F is an attractive force to be provided by an electromagnet, then the control current is given by I=k √F; otherwise, for repulsive forces, the control current is zero.

9. A vibration-reducing apparatus according to claim 5, wherein the electromagnets (75 to 86) include a first group of two electromagnets (75 and 76) for setting the two active masses (49 and 50) into vibration along a first axis perpendicular to the longitudinal axis of the flexible cylindrical rod (48), a second group of two electromagnets (77 and 78) for setting the two active masses (49 and 50) into vibration along a second axis perpendicular to the longitudinal axis of the flexible cylindrical rod (48) and the first axis, and a third group of eight electromagnets (79 to 86) for setting the two active masses (49 and 50) into vibration along a third axis parallel to the longitudinal axis of the flexible cylindrical rod (48).

10. A vibration-reducing apparatus according to claim 9, wherein control of the current for each electromagnet is similar to the operation of class C electronic amplifiers, in application of the following relationship:
    if F is an attractive force to be provided by an electromagnet, then the control current is given by $$I = k\sqrt{F} \ ;$$

otherwise, for repulsive forces, the control current is zero.

11. The use of the vibration reducing apparatus according any one of claims 1 to 10 in reducing the propagation of vibration in parts or machines selected from the group consisting of ducts, ducts for conveying steam to power turbines, exhaust ducts of internal combustion engines, resilient supports and drive shafts.

* * * * *